United States Patent
Murota

(10) Patent No.: US 9,339,905 B2
(45) Date of Patent: May 17, 2016

(54) TOOL CHANGER FOR MACHINE TOOL

(71) Applicant: FANUC Corporation, Yamanashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 111 days.

(21) Appl. No.: 14/482,591

(22) Filed: Sep. 10, 2014

(65) Prior Publication Data

US 2015/0072845 A1 Mar. 12, 2015

(30) Foreign Application Priority Data

Sep. 11, 2013 (JP) .................. 2013-188423

(51) Int. Cl.
*B23Q 3/157* (2006.01)
*B23Q 3/155* (2006.01)

(52) U.S. Cl.
CPC .. *B23Q 3/15706* (2013.01); *B23Q 2003/15586* (2013.01); *B23Q 2003/15593* (2013.01); *B23Q 2220/002* (2013.01); *Y10T 483/12* (2015.01); *Y10T 483/13* (2015.01); *Y10T 483/1755* (2015.01); *Y10T 483/1795* (2015.01)

(58) Field of Classification Search
CPC ........... B23Q 3/15506; B23Q 3/15566; B23Q 3/15706; Y10T 483/12; Y10T 483/1752; Y10T 483/1755; Y10T 483/1757; Y10T 483/176; Y10T 483/179; Y10T 483/1793; Y10T 183/1795; Y10T 483/1798

USPC .............. 483/4, 38, 39, 40, 41, 54, 55, 56, 57
See application file for complete search history.

(56) References Cited

U.S. PATENT DOCUMENTS

| | | | | |
|---|---|---|---|---|
| 4,955,127 A * | 9/1990 | Suda | ................... | B23Q 3/15706 29/26 A |
| 5,020,210 A * | 6/1991 | Fujimoto | ........... | B23Q 3/15706 483/54 |
| 5,499,963 A * | 3/1996 | Fujimoto | ........... | B23Q 3/15706 483/54 |
| 7,445,587 B2 * | 11/2008 | Kojima | .............. | B23Q 3/15706 483/39 |
| 7,578,776 B1 * | 8/2009 | Sun | .................... | B23Q 3/15706 483/39 |

FOREIGN PATENT DOCUMENTS

| | | |
|---|---|---|
| CN | 100351038 C | 11/2007 |
| CN | 201511268 U | 6/2010 |
| JP | 11-90752 A | 4/1999 |
| JP | 2005205503 A * | 8/2005 |
| JP | 2006-272473 A | 10/2006 |
| JP | 2007-290113 A | 11/2007 |
| JP | 2009034794 A * | 2/2009 |

\* cited by examiner

*Primary Examiner* — Sunil K Singh
*Assistant Examiner* — Michael Vitale
(74) *Attorney, Agent, or Firm* — Hauptman Ham, LLP

(57) ABSTRACT

In a tool changer, a turret can move toward and away from a spindle through a swinging movement about a swing shaft. Force applied to a turret mechanism unit at each phase in the swinging movement of the turret is calculated, and a swinging pattern of the turret is determined in accordance with the result of the calculation.

2 Claims, 5 Drawing Sheets

FIG. 2A
FIG. 2B
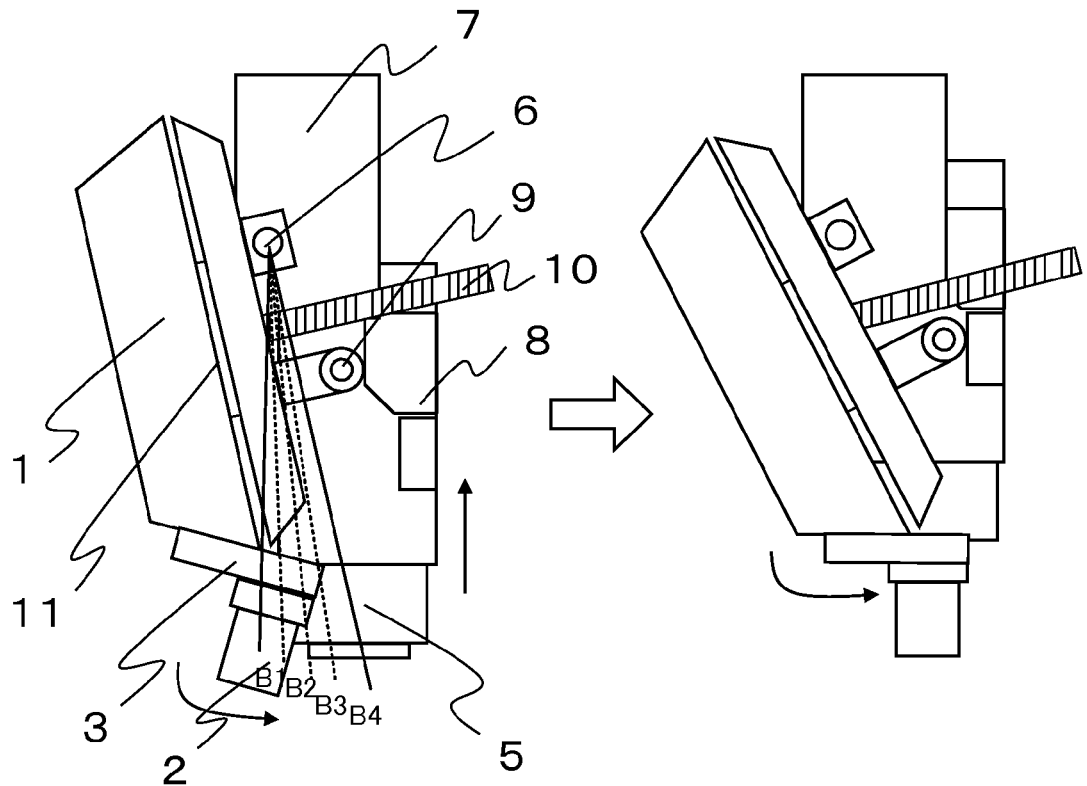
FIG. 3
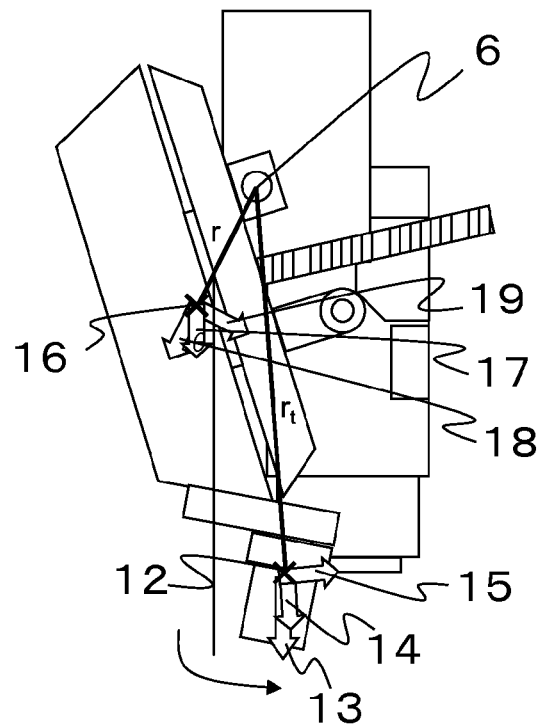

TOOL CHANGER FOR MACHINE TOOL

RELATED APPLICATIONS

The present application claims priority to Japanese Application Number 2013-188423, filed Sep. 11, 2013, the disclosure of which is hereby incorporated by reference herein in its entirety.

BACKGROUND OF THE INVENTION

1. Field of the Invention

The present invention relates to a tool changer for a machine tool. The tool changer detaches and attaches tools through a swinging movement of a turret toward and away from a spindle head.

2. Description of the Related Art

Tool changers that automatically change a tool, attached to a spindle of a machine tool, have conventionally been known. These tool changers have the following configuration. Specifically, a plurality of tools required for machining are set to a plurality of tool holders around a turret. The tool attached to the spindle of the machine tool is automatically changed to a tool designated in accordance with a machining state.

Some such tool changers change the tool in the following manner. Specifically, the designated tool is indexed through a rotating movement of the turret, and the tool attached to the spindle is changed to the indexed tool through a swinging movement of the turret toward and away from the spindle head. The rotating movement of the turret is in rotating directions in the front view of the turret, that is, in the directions of the arrow in FIG. 1. The swinging movement of the turret is in a swinging direction in the side view of the turret, that is, in a movement direction from one of the states in FIG. 2A and in FIG. 2B to the other state.

The tool changer with this configuration moves the tool holder away from the spindle when the machining is in process. Thus, a large machining area can be advantageously ensured.

The following techniques related to the tool changing in the tool changer have been developed. Japanese Patent Application Laid-open No. 2007-290113 discloses the tool changer configured to move the tool holder away from the spindle when the machining is in process. Here, a control is performed so that the turret moves toward the spindle with a swinging movement speed pattern of smoothly slowing down toward an end point of the swing movement, and the turret moves away from the spindle with a swinging movement speed pattern of smoothly speeding up after the swinging movement starts. Thus, the impact on the turret, in the swinging movement, is reduced, whereby a turret mechanism unit prevents the tool holder from receiving a large load. As a result, parts of the turret are prevented from wearing and the tool is prevented from falling off.

Japanese Patent Application Laid-open No. H11-90752 discloses a tool changer that shortens the tool changing time by switching the tool change speed in accordance with the weight of the tool to be changed.

Japanese Patent Application Laid-open No. 2006-272473 discloses a tool changer configured to change a tool by moving a spindle head within a tool changing area. Here, the movement speed of the tool is changed in accordance with the weight of the tool to be changed. Thus, the impact due to mechanical collision caused in the tool changing is reduced, whereby higher reliability is achieved.

The tool changer disclosed in Japanese Patent Application Laid-open No. 2007-290113, which performs tool changing by swinging the turret to move toward and away from the spindle head, controls the speed of the turret moving toward and away from the spindle head. Here, the pattern of the swinging movement is the same regardless of the weight and the arrangement of the tools on the turret. Thus, a certain arrangement of the tools on the turret might result in extremely small impact on the turret in the swinging movement, leaving room for increment in the swing speed. This means that the swinging movement time is longer than necessary, and thus the tool changing time is not sufficiently shortened.

The tool changers disclosed in Japanese Patent Application Laid-open No. H11-90752 and Japanese Patent Application Laid-open No. 2006-272473 change the movement speed in accordance with the weight of the tool in the tool changing. Thus, a shorter tool changing time and lower mechanical impact produced in the tool changing can be achieved. However, the tool changers involve no swinging movement of the turret in the tool changing, and thus cannot solve the problem due to the swinging movement of the turret in the tool changing.

SUMMARY OF THE INVENTION

In view of this, an object of the present invention is to provide a tool changer for a machine tool that changes a tool through a swinging movement of a turret, and can perform tool changing with the highest possible swinging movement speed and small impact on the turret.

A tool changer for a machine tool according to an aspect of the present invention includes: a turret that is provided with a plurality of grips and is capable of holding a tool with each of the grips; a spindle that is capable of holding the tool; and a swing shaft as an axis of swinging of the turret. The tool changer is configured to exchange the tool between the turret and the spindle. The turret is capable of moving toward and away from the spindle through a swinging movement about the swing shaft. The tool changer further includes: a calculation unit configured to calculate, for each phase of the swinging movement of the turret, force applied to a turret mechanism unit based on a sum of gravity force, centrifugal force, and inertial force from acceleration or deceleration applied to a turret mechanism unit, obtained on the basis of gravity center position of the turret, whole weight of the turret, and an angular velocity and an angular acceleration in the swinging movement of the turret; a turret swinging movement pattern determination unit configured to determine a swinging movement pattern of the turret such that the force applied to the turret mechanism unit in the swinging movement of the turret does not exceed a preset limit value of the force applied to the turret mechanism unit; and a control device configured to cause the turret to make the swinging movement, on the basis of the swinging movement pattern determined by the turret swinging movement pattern determination unit.

In this configuration, the force applied to the turret mechanism unit is calculated from the sum of the gravity force, the centrifugal force, and the inertial force from acceleration or deceleration applied to the turret mechanism unit, for each phase of the turret in the swinging movement. Then, the swinging movement pattern of the turret is determined in such a manner that the force does not exceed the limit value. Thus, an optimum swing speed of the turret can be determined for each phase of the turret, whereby a shorter tool changing time can be achieved.

A tool changer for a machine tool according to another aspect of the present invention includes: a turret that is provided with a plurality of grips and is capable of holding a tool with each of the grips; a spindle that is capable of holding the tool; and a swing shaft as an axis of swinging of the turret. The tool changer is configured to exchange the tool between the turret and the spindle. The turret is capable of moving toward and away from the spindle through a swinging movement about the swing shaft. The tool changer further include: a calculation unit configured to calculate, for each phase of the swinging movement of the turret, force applied to each of the grips based on a sum of gravity force, centrifugal force, and inertial force from acceleration or deceleration applied to each of the tools, obtained on the basis of tool weight data on the tool set to the grip, tool arrangement data on the tools on the grips, and an angular velocity and an angular acceleration in the swinging movement of the turret; a largest force obtaining unit configured to obtain the largest force in the forces applied to the grips calculated by the calculation unit; a turret swinging movement pattern determination unit configured to determine a swinging movement pattern of the turret such that the largest force obtained by the largest force obtaining unit does not exceed a preset limit value of the force applied to the grip, in the swinging movement of the turret; and a control device configured to cause the turret to make the swinging movement on the basis of the swinging movement pattern determined by the turret swinging movement pattern determination unit.

In this configuration, the force applied to each of the grips is calculated from the sum of the gravity force, the centrifugal force, and the inertial force from acceleration or deceleration applied to the tool, for each phase of the turret in the swinging movement. Then, the swinging movement pattern of the turret is determined in such a manner that the force does not exceed the limit value. Thus, an optimum swing speed of the turret can be determined for each phase of the turret, whereby a shorter tool changing time can be achieved.

With the configurations, the present invention provides a tool changer for a machine tool that changes a tool through a swinging movement of a turret, and, upon the swinging movement for tool change, can perform tool changing with the highest possible swinging movement speed and small impact on the turret.

BRIEF DESCRIPTION OF THE DRAWINGS

The above-described object and features of the present invention, as well as other objects and features, will be appreciated from the following description of embodiments considered in connection with the accompanying drawings, in which:

FIGS. 2A and 2B are schematic side views of the turret;

FIG. 3 is a schematic diagram for describing how forces are applied to a turret mechanism unit and a tool in the tool changer;

DESCRIPTION OF THE PREFERRED EMBODIMENTS

First Embodiment

Figure 1:
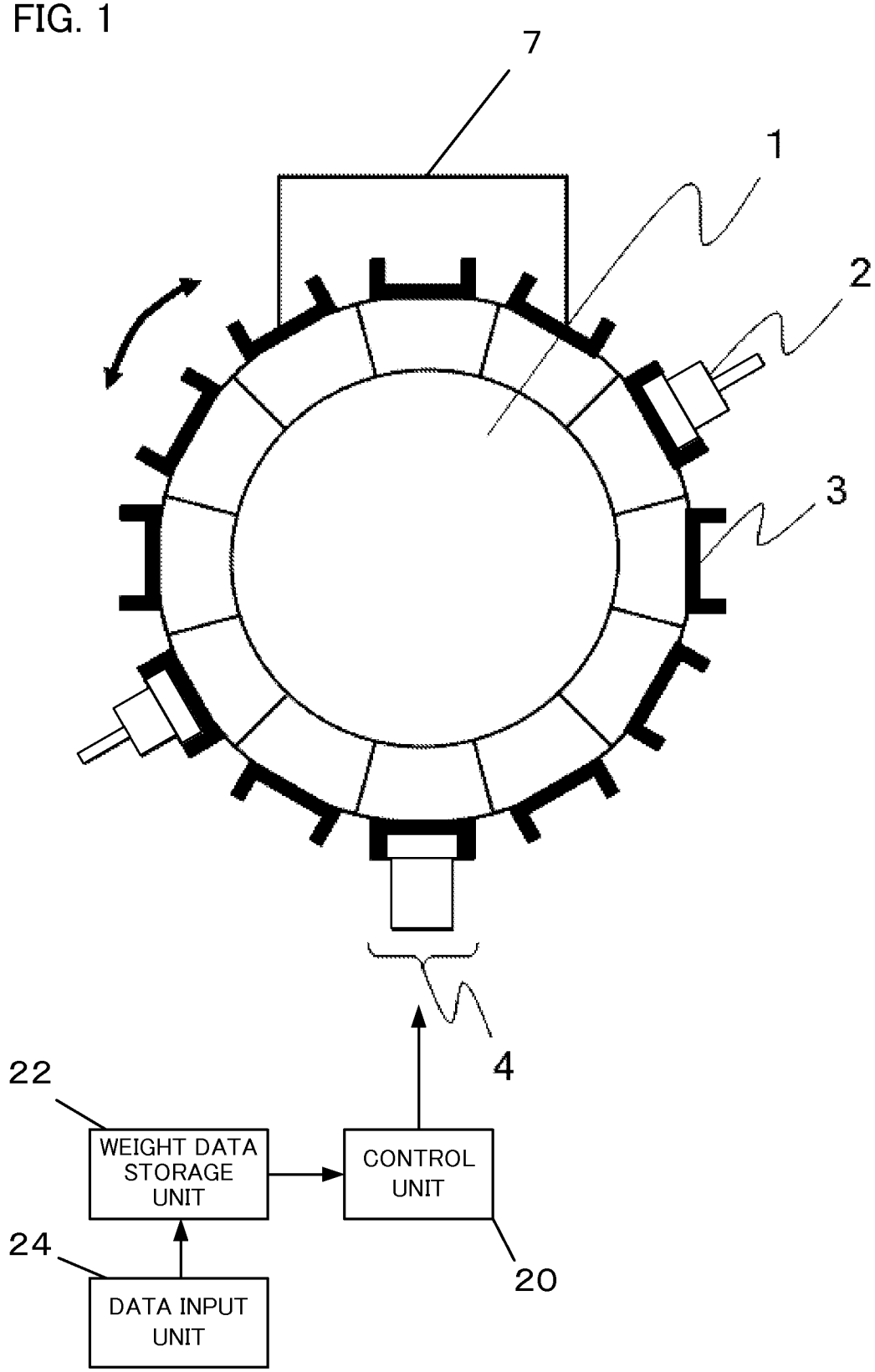
FIG. 1 is a schematic front view of a turret used in a tool changer.

FIG. 1 is a schematic front view of a turret used in a tool changer of this embodiment. Reference sign 1 denotes a turret including a plurality of tool holders 3. In FIG. 1, 12 tool holders 3 are radially disposed on the circumference of the turret 1, and tools 2 are held by appropriate parts of the tool holders 3. When a tool changing instruction is issued to a control unit 20 of a machine tool, the turret 1 is rotated so that the tool 2 to be set reaches a tool change position 4. This operation is hereinafter referred to as "indexing" as appropriate. The tools 2 are detached from and attached to a spindle 5 through a swinging movement of the turret 1 about a swing shaft 6, making the tool change position 4 move toward and away from the spindle 5.

FIGS. 2A, 2B show schematic side views of the turret 1 at an operation position in FIG. 2A and at a tool attachment/detachment position in FIG. 2B. Reference sign 5 denotes the spindle, reference sign 6 denotes the swing shaft, reference sign 7 denotes a turret supporter, reference sign 8 denotes a cam, reference sign 9 denotes a cam follower, reference sign 10 denotes a biasing spring, and reference sign 11 denotes a turret mechanism unit. The turret 1 is attached to be able to swing about the swing shaft 6, and thus swings between the operation position in FIG. 2A and the tool attachment/detachment position in FIG. 2B. The turret 1 receives biasing force from the biasing spring 10 to swing from the operation position to the tool attachment/detachment position. This swinging movement of the turret 1 causes the rotation of the cam 8 and the cam follower 9, which in turn causes the upward movement of the spindle 5. Thus, a space is secured where the tool holder 3 holding the tool 2 enters and the detachment and the attachment of the tools 2 take place.

In this embodiment, force applied to the turret mechanism unit 11 when the turret 1 swings, is calculated. An angular velocity and an angular acceleration in the swinging movement of the turret 1 are determined based on the force thus calculated, so that the tool changing time is shortened with the force, applied to each portion of the turret 1, prevented from exceeding a limit value.

How the force applied to the turret mechanism unit 11 is calculated and the swinging movement pattern of the turret 1 is determined will be described by referring to FIG. 3. Reference sign 16 denotes the turret center of gravity, reference sign 17 denotes the gravity applied to the turret center of gravity, reference sign 18 denotes centrifugal force applied to the turret center of gravity, and reference sign 19 denotes inertial force applied to the turret center of gravity from acceleration or deceleration. Here, the gravity 17 applied to the turret center of gravity is obtained as Mg, the centrifugal force 18 applied to the turret center of gravity is obtained as Mr2ω, and the inertial force 19 applied to the turret center of gravity is obtained as Mrα, where M is the whole weight of the turret 1, r is the distance from the turret center of gravity 16 to the swing shaft 6 of the turret 1, θ is an angle formed when the turret 1 swings between the directions from the swing shaft 6 toward the vertically lower side and toward the turret center of gravity 16, ω is an angular velocity, and α is an angular acceleration. Force F applied to the turret mechanism unit 11 can be obtained as the vector sum of the forces.

Next, the turret swinging movement pattern is determined based on the force F applied to the turret mechanism unit 11. A limit value $F_{limit}$ of the force applied to the turret mechanism unit 11 set in advance is input through a data input unit 24 for example, and stored in a weight data storage unit 22. Then, patterns of an angular velocity and an angular acceleration of the turret 1 are determined to achieve the shortest possible time of the entire swinging movement, with the force F applied to the turret mechanism unit 11 prevented from exceeding the limit value $F_{limit}$. A specific method for determining the angular velocity and the angular acceleration is described below.

Figure 4:
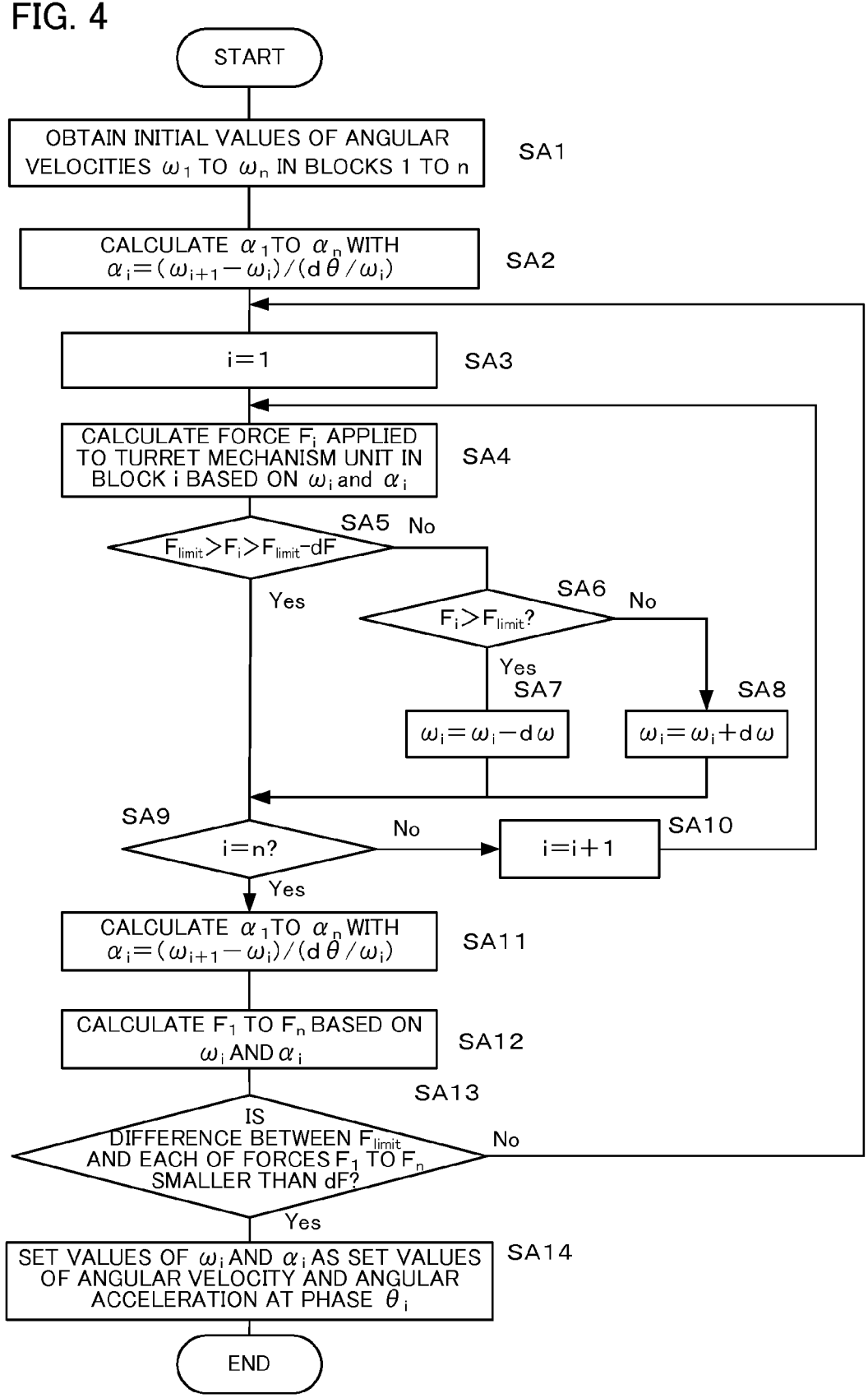
FIG. 4 is a flowchart showing a flow for determining a swinging movement pattern of the turret in a first embodiment.

FIG. 4 is a flowchart showing a flow for determining the swinging movement pattern of the turret 1. The swinging movement from the starting point to the end point is divided into a plurality of blocks, sequentially defined as blocks 1, 2, . . . , and n. An angular velocity $\omega_i$ and an angular acceleration $\alpha_i$ in each of the blocks 1 to n are determined. FIG. 2A shows an example where the swinging movement is divided into four blocks B1 to B4. Each step in the flowchart is described below.

(Step SA1)

Initial values of angular velocities $\omega_1$ to $\omega_n$, in the respective blocks 1 to n as a result of dividing a series of swinging movement of the turret 1, are set. The initial values are merely an initial setting, which will be modified into an optimum value, and thus can be arbitrarily set. For example, the initial values may be the same as that in a speed pattern for the swinging movement of the turret 1 in the conventional configuration.

(Step SA2)

Angular accelerations $\alpha_1$ to $\alpha_{n-1}$ are calculated. Here, the angular acceleration $\alpha_i$ is $(\omega_{i+1}-\omega_i)/(d\theta/\omega_i)$, where $d\theta$ is an angle between each two adjacent blocks, and $d\theta/\omega_i$ is a movement time between each two adjacent blocks. The value of $\alpha_n$ is set to be the same as $\alpha_{n-1}$.

(Step SA3)

Here, i is set to 1.

(Step SA4)

Force $F_i$ applied to the turret mechanism unit 11 in each block is calculated based on $\omega_i$ and $\alpha_i$. Specifically, the force $F_i$ is calculated as the vector sum of gravity force 17 Mg, centrifugal force 18 Mr2$\omega$), and inertial force 19 Mr$\alpha$ that are applied to the turret center of gravity 16, at each block position.

(Step SA5)

Whether the difference between the thus calculated force Fi, applied to the turret mechanism unit 11, and a limit value $F_{limit}$ of the force applied to the turret mechanism unit 11, does not exceed an acceptable error dF is determined. When $F_{limit}>F_i>F_{limit}-dF$ holds true, that is, when the difference from the limit value $F_{limit}$ of the force applied to the turret mechanism unit 11 is smaller than the acceptable error dF (YES), the processing proceeds to step SA9. When any one of the inequality signs is not satisfied (NO), the processing proceeds to step SA6.

(Step SA6)

Whether the force $F_i$ applied to the turret mechanism unit 11 exceeds the limit value $F_{limit}$ of the force applied to the turret mechanism unit 11 is determined. The processing proceeds to step SA7 when the force $F_i$ exceeds the limit value $F_{limit}$ (YES), and proceeds to step SA8 when the force $F_i$ is equal to or smaller than the limit value $F_{limit}$ (NO).

(Step SA7)

The angular velocity $\omega_i$ is reduced by a step width d$\omega$ for angular velocity change, and the processing proceeds to step SA9.

(Step SA8)

The angular velocity $\omega_i$ is increased by the step width D$\omega$ for angular velocity change, and the processing proceeds to step SA9.

(Step SA9)

Whether the value of i is equal to n is determined. The processing proceeds to step SA11 when the values are the same (YES), and proceeds to step SA10 when the values are different (NO).

(Step SA10)

Here, i is incremented by 1, and the processing returns to step SA4.

(Step SA11)

Angular accelerations $\alpha_1$ to $\alpha_n$ are calculated. Here, an angular acceleration $\alpha_i$ is $(\omega_{i+1}\omega_i)/(d\theta/\omega_i)$.

(Step SA12)

The forces $F_1$ to $F_n$ applied to the turret mechanism unit 11 in the respective blocks are calculated based on $\omega_i$ and $\alpha_i$.

(Step SA13)

Whether the differences between the limit value $F_{limit}$ and each of the forces $F_1$ to $F_n$ obtained in step SA12 is smaller than the acceptable error dF is determined. The processing proceeds to step SA14 when all the differences are smaller than the acceptable error dF (YES), and returns to step SA3 when any one of the differences is equal to or larger than the acceptable error dF (NO).

(Step SA14)

The values of $\omega_i$ and $\alpha_i$ are respectively set as set values of the angular velocity and the angular acceleration in a block i at a phase $\theta_i$, and the processing is terminated.

Second Embodiment

Next, a second embodiment is described based on drawings. In the first embodiment, the force applied to the turret mechanism unit 11 is calculated based on the weight, the angular velocity, and the angular acceleration of the turret 1 to determine the swinging movement pattern of the swinging movement of the turret 1. This embodiment is different from the first embodiment in that force applied to the tool holder 3 of the turret is calculated to determine the swinging movement pattern of the swinging movement of the turret 1.

First of all, the force applied to the tool holder 3 is calculated. In FIG. 3, 12 denotes a center of gravity of the tool, 13 denotes a gravity applied to the tool, 14 denotes a centrifugal force applied to the tool, and 15 denotes an inertial force applied to the tool from the acceleration or deceleration. Here, the gravity applied to the tool 2 is obtained as mg, the centrifugal force applied to the tool 2 is obtained as mrt2$\omega$, and the inertial force applied to the tool 2 from acceleration or deceleration is obtained as mrt$\alpha$, where m is the weight of the tool 2 attached to the tool holder 3, rt is the distance from the center of gravity of the tool 2 to the swing shaft 6 of the turret 1, $\theta$ is the angle between the directions from the swing shaft 6 of the turret 1 toward the vertically lower side and toward the turret center of gravity 16, $\omega$ is the angular velocity, and $\alpha$ is the angular acceleration. The force applied to the tool holder 3 can be obtained as a vector sum of the forces applied to the tool 2.

Thus, force Ft applied to the tool holder 3 can be calculated. The force Ft is calculated for all the tools 2 held by the tool holders 3 of the turret 1, as forces Ft1 to Ftm respectively applied to the tool holders 3, and the largest one is defined as largest force $F_{tmax}$. The swinging movement pattern of the turret 1 is determined based on the largest force $F_{tmax}$ of the tool holder 3 thus obtained. Specifically, limit value $F_{tlimit}$ of the force applied to the tool holder 3 is set in advance. The patterns of the angular velocity and the angular acceleration of the turret 1 are determined to achieve the shortest possible time of the entire swinging movement, with the largest force $F_{tmax}$ applied to the tool holder 3 prevented from exceeding the limit value $F_{tlimit}$. A specific method for determining the angular velocity and the angular acceleration is described below.

Figure 5:
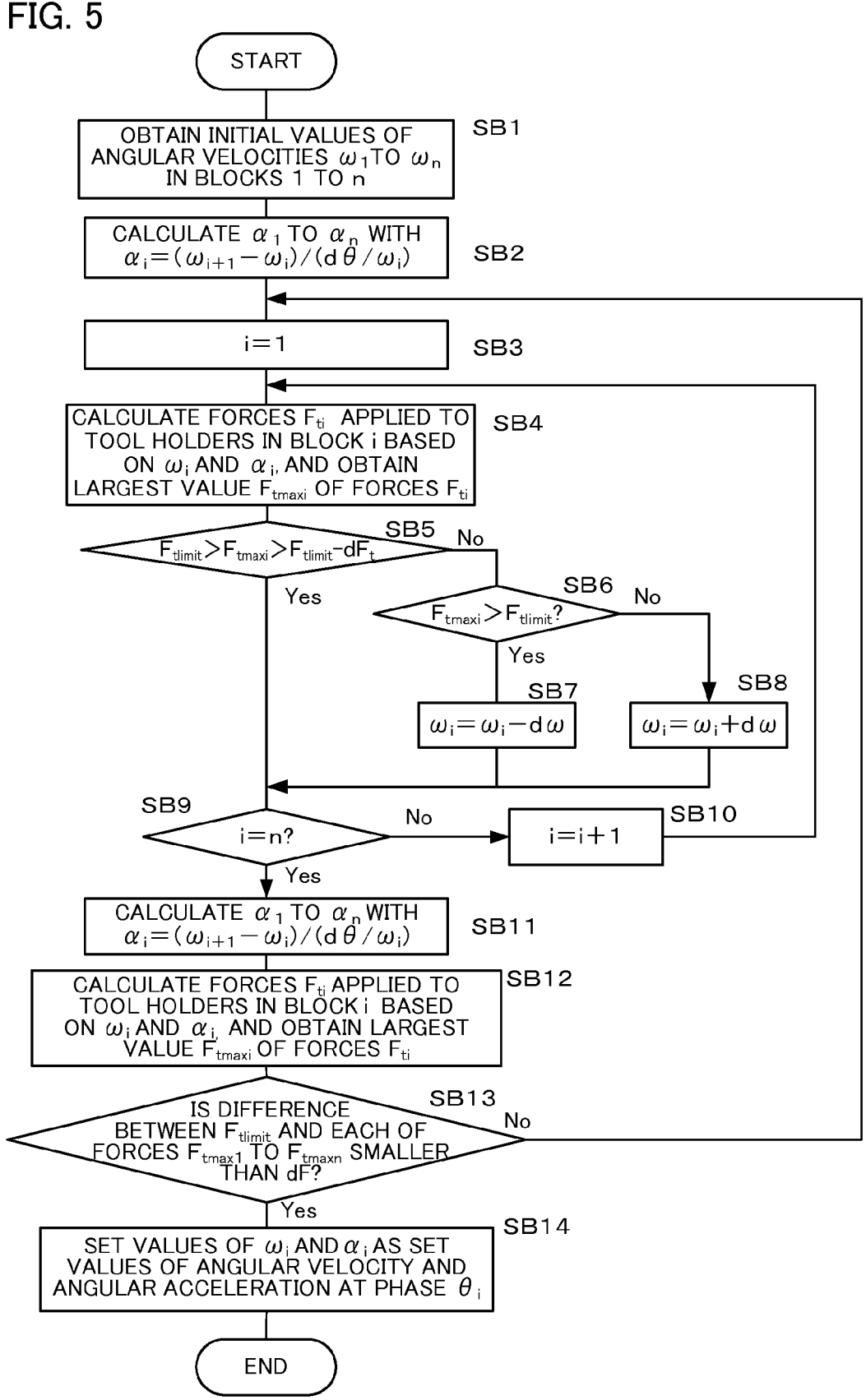
FIG. 5 is a flowchart showing a flow for determining a swinging movement pattern of the turret in a second embodiment.

FIG. 5 is a flowchart showing a flow for determining the swinging movement pattern of the turret 1. The swinging movement from the starting point to the end point is divided into a plurality of blocks, sequentially defined as blocks 1, 2, ..., and n. The angular velocity $\omega_i$ and the angular acceleration $\alpha_i$ in each of the blocks 1 to n are determined. FIG. 2A shows an example where the swinging movement is divided into four blocks B1 to B4. Each step in the flowchart is described below.

(Step SB1)

Initial values of angular velocities $\omega_1$ to $\omega_n$, in the respective blocks 1 to n as a result of dividing a series of swinging movement of the turret 1, are set. The initial values are merely an initial setting, which will be modified into an optimum value, and thus can be arbitrarily set. For example, the initial values may be the same as that in a speed pattern for the swinging movement of the turret 1 in the conventional configuration.

(Step SB2)

Angular accelerations $\alpha_1$ to $\alpha_{n-1}$ are calculated. Here, the angular acceleration $\alpha_i$ is $(\omega_{i+1}-\omega_i)/(d\theta/\omega_i)$, where $d\theta$ is an angle between each two adjacent blocks, and $d\theta/\omega_i$ is a movement time between each two adjacent blocks. The value of $\alpha_n$ is set to be the same as $\alpha_{n-1}$.

(Step SB3)

Here, i is set to 1.

(Step SB4)

Force $F_{ti}$ applied to each tool holder 3 in each block is calculated based on $\omega_i$ and $\alpha_i$. Specifically, the force $F_{ti}$ is obtained as the vector sum of the gravity force mg, the centrifugal force $mrt2\omega$, and the inertial force $mrt\alpha$ that are applied to the tool 2 of each tool holder 3, where rt is the distance between the swing shaft 6 of the turret 1 and the center of gravity of the tool 2 of each tool holder 3. Then, the largest force $F_{tmax}$ of the thus calculated forces applied to the tool holders 3, is obtained.

(Step SB5)

Whether the difference between the thus calculated largest force $F_{tmaxi}$, applied to the tool holder 3, and the limit value $F_{tlimit}$ of the force applied to the tool holder 3, does not exceed an acceptable error $dF_t$ is determined. When $F_{tlimit} > F_{tmax} > F_{tlimit} - dF_t$ holds true, that is, when the difference from the limit value $F_{tlimit}$ of the force applied to the tool holder 3 is smaller than the acceptable error $dF_t$ (YES) the processing proceeds to step SB9. When any one of the inequality signs is not satisfied (NO), the processing proceeds to step SB6.

(Step SB6)

Whether the largest force $F_{tmaxi}$ of the force applied to the tool holder 3 exceeds the limit value $F_{tlimit}$ of the force applied to the tool holder 3 is determined. The processing proceeds to step SB7 when the largest force $F_{tmaxi}$ exceeds the limit value $F_{tlimit}$ (YES), and proceeds to step SB8 when the largest force $F_{tmaxi}$ is equal to or smaller than the limit value $F_{tlimit}$ (NO).

(Step SB7)

The angular velocity $\omega_i$ is reduced by a step width $d\omega$ for angular velocity change, and the processing proceeds to step SB9.

(Step SB8)

The angular velocity $\omega_i$ is increased by the step width $D\omega$ for angular velocity change, and the processing proceeds to step SB9.

(Step SB9)

Whether the value of i is equal to n is determined. The processing proceeds to step SB11 when the values are the same (YES), and proceeds to step SB10 when the values are different (NO).

(Step SB10)

Here, i is incremented by 1, and the processing returns to step SB4.

(Step SB11)

Angular accelerations $\alpha_1$ to $\alpha_{n-1}$ are calculated. Here, the angular acceleration $\alpha_i$ is $(\omega_{i+1}-\omega_i)/(d\theta/\omega_i)$. The value of $\alpha_n$ is set to be the same as $\alpha_{n-1}$.

(Step SB12)

The force $F_i$ applied to each tool holder 3 in each block is calculated based on $\omega_i$ and $\alpha_i$, and then the largest force $F_{tmaxi}$ of the forces $F_i$ is obtained.

(Step SB13)

Whether the difference between the limit value $F_{tlimit}$ and each of the forces $F_{tmax1}$ to $F_{tmaxn}$ obtained in step SB12 is smaller than the acceptable error $dF_t$ is determined. The processing proceeds to step SB14 when all the differences are smaller than the acceptable error $dF_t$ (YES), and returns to step SB3 when any one of the differences is equal to or larger than the acceptable error $dF_t$ (NO).

(Step SB14)

The values of $\omega_i$ and $\alpha_i$ are respectively set as set values of the angular velocity and the angular acceleration in the block i at the phase $\theta_i$, and the processing is terminated.

In this embodiment, the forces applied to all the tool holders 3 respectively holding the tools 2 are calculated. Alternatively, when this configuration leads to a long calculation time, calculation for the tool holders 3 that obviously receive small force may be omitted. Thus, the angular velocity and the angular acceleration at each swinging phase may be calculated only from the forces applied to some of the tool holders 3. This requires accurate selection of the tool holder 3, of which the applied force is not calculated, but can calculate the angular velocity and the angular acceleration with a shorter time.

In the first and the second embodiments, the angular velocity is adjusted only once in each block and then whether the difference from the limit value is smaller than the acceptable error dF in all blocks is determined. Then, when any of the differences exceeds the acceptable error dF, the adjustment is repeated for all the blocks. Alternatively, in each block, the adjustment may be repeated until the difference from the limit value becomes lower than the acceptable error dF, and then the adjustment in the next block may be started.

Figure 6:
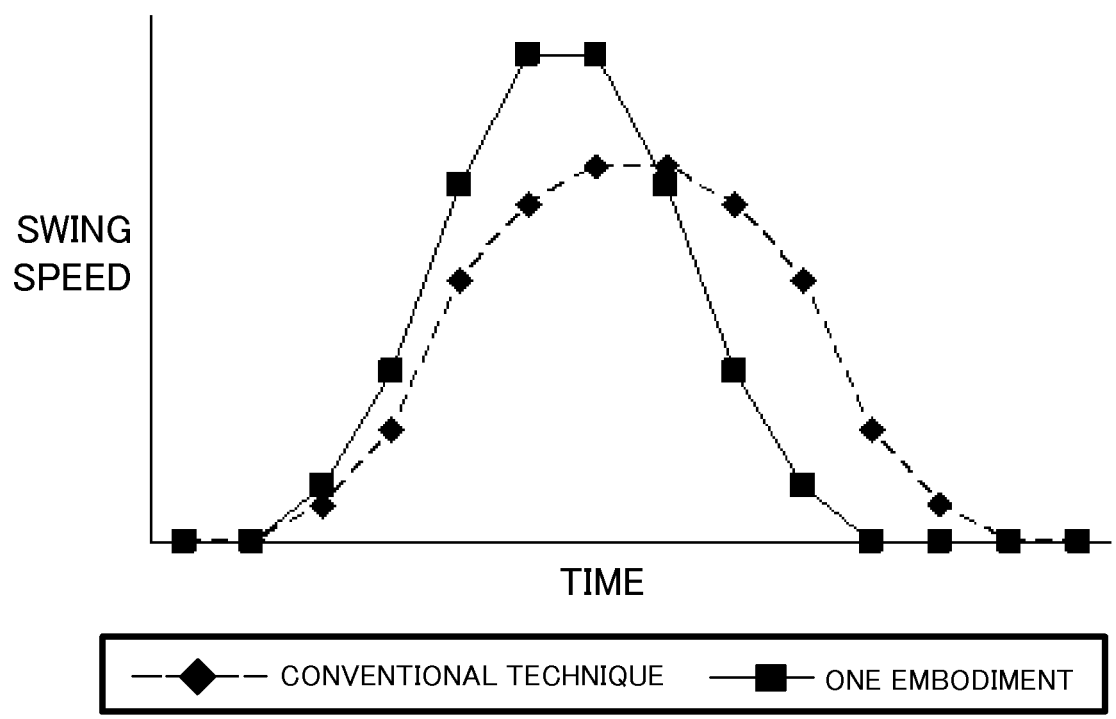
FIG. 6 is a graph showing difference from a conventional technique in a swinging movement speed of the turret.

FIG. 6 is a graph showing how the swing speed of the turret 1 changes in one embodiment. In the conventional technique, the swinging movement pattern of the turret 1 is the same regardless of the arrangement of the tools 2 in the tool holders 3 on the turret 1. Thus, for example, when the total weight of the tools 2 on the turret 1 is small, the impact applied to the turret 1 might be smaller than necessary even when the swing speed is increased. In this embodiment, the swinging movement of the turret 1 is determined to achieve the highest possible swing speed, with the load on the tool holder 3 prevented from exceeding the limit value set in advance at each swinging position of the turret 1. Thus, a higher swing speed can be achieved, whereby the tool changing time can be shortened, compared with the conventional technique, as shown in FIG. 6.

It is to be noted that an effect shown in FIG. 6, showing how the tool changing time is shortened in this embodiment, can be obtained also in the first embodiment.

The invention claimed is:

1. A tool changer for a machine tool,
   the machine tool including:
   a turret that is provided with a plurality of grips and is capable of holding a tool with each of the grips;
   a spindle that is capable of holding the tool;

a rotation shaft as an axis of rotation of the turret;
a turret mechanism unit for rotating the turret; and
a swing shaft as an axis of swinging of a whole turret structure consisting of the turret and the turret mechanism unit, wherein the tool changer is configured to exchange the tool between the turret and the spindle, and the turret is capable of moving toward and away from the spindle through a swinging movement about the swing shaft, the tool changer comprising:
- a calculation unit configured to calculate, for each phase of the swinging movement of the turret, force applied to the turret mechanism unit based on a sum of gravity force, centrifugal force, and inertial force from acceleration or deceleration applied to the turret mechanism unit, obtained on the basis of gravity center position of the whole turret structure, whole weight of the turret, and an angular velocity and an angular acceleration in the swinging movement of the turret;
- a turret swinging movement pattern determination unit configured to determine an angular velocity and an angular acceleration for each phase of the swinging movement of the turret as a swinging movement pattern of the turret such that the force applied to the turret mechanism unit in the swinging movement of the turret does not exceed a preset limit value of the force applied to the turret mechanism unit; and
- a control device configured to cause the turret to make the swinging movement, on the basis of the swinging movement pattern determined by the turret swinging movement pattern determination unit.

2. A tool changer for a machine tool, the machine tool including:
- a turret that is provided with a plurality of grips and is capable of holding a tool with each of the grips;
- a spindle that is capable of holding the tool;
- a rotation shaft as an axis of rotation of the turret;
- a turret mechanism unit for rotating the turret; and
- a swing shaft as an axis of swinging of a whole turret structure consisting of the turret and the turret mechanism unit, wherein the tool changer is configured to exchange the tool between the turret and the spindle, and the turret is capable of moving toward and away from the spindle through a swinging movement about the swing shaft, the tool changer comprising:
- a calculation unit configured to calculate, for each phase of the swinging movement of the turret, force applied to each of the grips based on a sum of gravity force, centrifugal force, and inertial force from acceleration or deceleration applied to each of the tools, obtained on the basis of tool weight data on the tool set to the grip, tool arrangement data on the tools on the grips, and angular velocity and angular acceleration in the swinging movement of the turret;
- a largest force obtaining unit configured to obtain the largest force in the forces applied to the grips calculated by the calculation unit;
- a turret swinging movement pattern determination unit configured determine an angular velocity and an angular acceleration for each phase of the swinging movement of the turret as a swinging movement pattern of the turret such that the largest force obtained by the largest force obtaining unit does not exceed a preset limit value of the force applied to the grip, in the swinging movement of the turret; and
- a control device configured to cause the turret to make the swinging movement on the basis of the swinging movement pattern determined by the turret swinging movement pattern determination unit.

\* \* \* \* \*